Patented Feb. 18, 1936

2,030,970

UNITED STATES PATENT OFFICE 2,030,970

AZO DYES AND METHODS FOR THEIR PRODUCTION

Miles Augustinus Dahlen, Wilmington, Del., assignor to E. I. du Pont de Nemours & Company, Wilmington, Del., a corporation of Delaware No Drawing. Application January 6, 1933, Serial No. 650,506

14 Claims. (Cl. 260—77)

This invention relates to new water-insoluble azo dyes and more particularly refers to azo dyes of the following general formula:

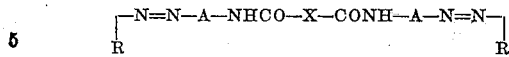

wherein R represents an ice color coupling component, A represents a para arylene nucleus which may be further substituted by alkyl, alkoxy and halogen groups but which is free from groups such as sulfonic or carboxylic acid groups which will render the dyes water-soluble, and X represents an arylene nucleus which may be further substituted by alkyl, alkoxy and halogen groups but which is free from groups such as sulfonic or carboxylic acid groups which will render the dyes water-soluble.

It is an object of this invention to produce new azo dyes of good fastness properties. A further object is to produce dyes which may be used as pigments or which may be imparted to textile fibers by dyeing or printing in various attractive shades and colors particularly in shades and colors ranging from red and bordeaux to violet, blue and black. A still further object is to produce water-insoluble dyes many of which are quite fast to light and which may be readily and economically manufactured. Additional objects will appear hereinafter.

These objects are attained by the process of the present invention wherein new aromatic diamines of the following general formula:

NH₂—A—NHCO—X—CONH—A—NH₂ are tetrazotized and coupled with ice color coupling components, preferably the arylamides of 2-3-hydroxy-naphthoic acid. In the above general formula A represents a para arylene nucleus preferably of the benzene or naphthalene series, which may be further substituted by alkyl, alkoxy and halogen groups but which is free from groups such as sulfonic or carboxylic acid groups which will render the dyes water-soluble, and X represents an arylene nucleus preferably of the benzene, naphthalene, diphenyl or diphenyl-ether series, which may be further substituted by alkyl, alkoxy and halogen groups but which is free from groups such as sulfonic or carboxylic acid groups which will render the dyes water-soluble.

These new aromatic diamines may be produced by various synthetic methods, among which may be mentioned the following: a para nitro arylamine having the following general formula:

in which formula A is defined as above, is condensed with an arylene-dicarbonyl-chloride of the following general formula:

ClCO—X—COCl in which formula X is defined as above. This results in the formation of a new compound having the general formula:

NO₂—A—NHCO—X—CONH—A—NO₂

The nitro groups of this new compound may thereupon be reduced by any of the well known methods such as treatment with iron and an acid, treatment with sodium sulfhydrate, or liquid phase hydrogenation over an active hydrogenating catalyst.

The invention may be more completely understood by reference to the following illustrative examples in which the quantities are stated in parts by weight:

Example 1

Cotton skeins, impregnated in the usual manner with the 5-chlor-o-toluidide of 2-3-hydroxy-naphthoic acid, were developed in a tetrazo bath prepared as follows:

17.3 parts of N,N'-di-(4-aminophenyl-terephthalamide were stirred with 30 parts of hydrochloric acid of 30% strength and 350 parts of cold water, and the base tetrazotized with 7 parts of sodium nitrite dissolved in 30 parts of water. When tetrazotization was completed, the solution was filtered and the mineral acidity neutralized with sodium acetate.

When the development of the color in the above bath was completed, the skeins were rinsed, soaped at the boil, rinsed and dried.

By this process a bright red dyestuff of the probable structure:

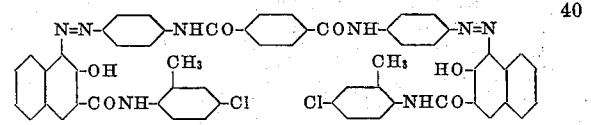

was obtained. The color possessed good fastness to light and washing.

Example 2

Cotton skeins, impregnated in the usual manner with the o-anisidide of 2-3-hydroxy-naphthoic acid, were developed in a tetrazo bath prepared as follows:

18.7 parts of N,N'-di-(2-methyl-4-aminophenyl)-terephthalamide were stirred in 30 parts of hydrochloric acid of 30% strength and 350 parts of cold water, and the base tetrazotized with 7 parts of sodium nitrite dissolved in 30 parts of water. When tetrazotization was completed, the solution was filtered and the mineral acidity neutralized with sodium acetate.

When the development of the dyestuff was completed, the skeins were soaped and rinsed as before. By this process a red dyestuff of very good fastness to light and washing was obtained. The dyestuff has the probable formula:

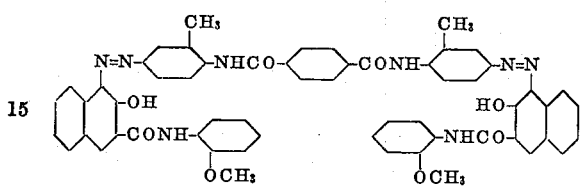

*Example 3*

Cotton skeins, padded in the usual manner with the p-chlor-anilide of 2-3-hydroxy-naphthoic acid and developed in the tetrazo bath prepared as in Example 2, were dyed to a bright red of good fastness to washing and fair fastness to light.

*Example 4*

Cotton skeins, padded in the usual manner with the o-anisidide of 2-3-hydroxy-naphthoic acid, were developed in a tetrazo bath prepared as follows:

20.3 parts of N,N'-di-(2-methoxy-4-aminophenyl)-terephthalamide were stirred in 30 parts of hydrochloric acid of 30% strength and 350 parts of cold water, and the base tetrazotized with 7 parts of sodium nitrite dissolved in 30 parts of water. The tetrazo solution was filtered and the mineral acidity neutralized with sodium acetate.

After the development in the above bath, and the rinsing and soaping of the skeins, a violet dyeing of good fastness to light and washing was obtained. The dye probably possesses the following formula:

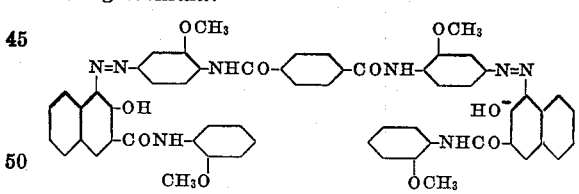

*Example 5*

Cotton skeins, impregnated in the usual manner with the anilide of 2-3-hydroxy-naphthoic acid, were developed in a tetrazo bath prepared as follows:

23.3 parts of N,N'-di-(2-5-dimethoxy-4-aminophenyl)-terephthalamide were stirred in 30 parts of hydrochloric acid of 30% strength and 350 parts of cold water, and the base tetrazotized with 7 parts of sodium nitrite dissolved in 30 parts of water. When tetrazotization was completed, the solution was filtered and the mineral acidity neutralized with sodium acetate.

After the development, and the rinsing and soaping of the skeins, a bright blue dyeing of good fastness to light and washing was obtained. The dyestuff has the probable structure:

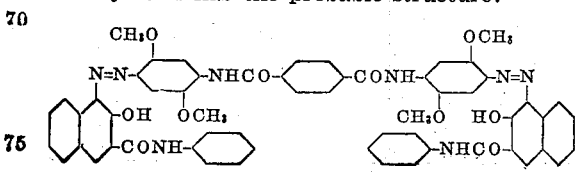

*Example 6*

Cotton skeins, padded in the usual manner with the o-toluidide of 2-3-hydroxy-naphthoic acid, were developed in a tetrazo bath prepared as follows:

23.75 parts of N,N'-di-(2-methoxy-4-amino-5-chlorophenyl)-terephthalamide were stirred in 30 parts of hydrochloric acid of 30% strength and 350 parts of cold water, and the base tetrazotized with 7 parts of sodium nitrite dissolved in 30 parts of water. The tetrazo solution was filtered and the mineral acidity neutralized with sodium acetate.

After the development, and the rinsing and soaping of the skeins, a reddish-blue dyeing of good fastness to light and washing was obtained. The dyestuff has the probable formula:

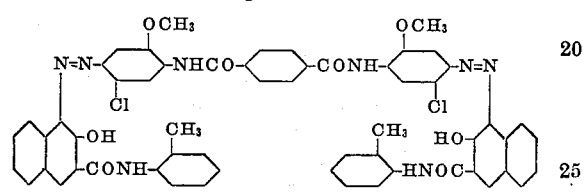

*Example 7*

Cotton skeins, padded with the anilide of 2-3-hydroxy-naphthoic acid, were developed in a tetrazo bath prepared from N,N'-di-(2-5-dimethoxy-4-aminophenyl)-isophthalamide by the method given in Example 5. After the development, and the rinsing and soaping of the skeins, a reddish-blue dyeing of good fastness to washing and fair fastness to light was obtained. The dye probably has the following formula:

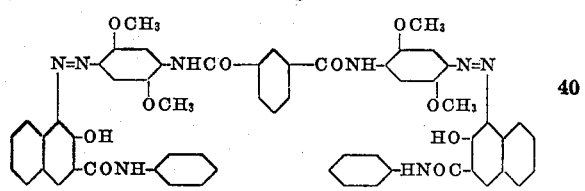

*Example 8*

Cotton skeins, impregnated in the usual manner with the anilide of 2-3-hydroxy-naphthoic acid, were developed in a tetrazo bath prepared from N,N'-di-(2-5-dimethoxy-4-aminophenyl)-phthalamide by the method given in Example 5. After the development, and the rinsing and soaping of the skeins, a violet dyeing of good fastness to washing and fair fastness to light was obtained. The dye probably has the following formula:

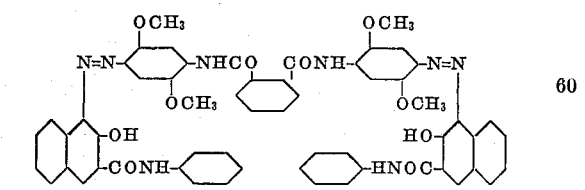

*Example 9*

A solution of the anilide of 2-3-hydroxy-naphthoic acid was prepared by stirring 10 parts of the anilide with 5 parts of alcohol, adding 25 parts of sodium hydroxide of 25% strength and 500 parts of water. A tetrazo solution prepared from N,N'-di-(2-5-dimethoxy-4-aminophenyl) terephthalamide was prepared as in Example 5. An equivalent quantity of the tetrazo solution was added to the solution of the anilide, resulting in coupling to form the insoluble pigment possessing the following constitution:

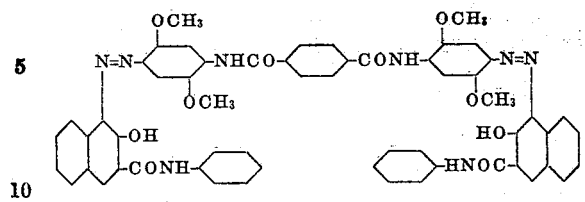

The pigment was filtered, washed and dried. It formed a black powder, which dissolved in concentrated sulfuric acid to a bright blue solution.

*Example 10*

23.3 parts of N,N'di-(2-5-dimethoxy-4-aminophenyl)-terephthalamide were stirred in 30 parts of hydrochloric acid of 30% strength and 350 parts of cold water, and the base tetrazotized by the addition of 7 parts of sodium nitrite dissolved in 30 parts of water. When tetrazotization was completed, the solution was filtered. 15 parts of piperidine-beta-carboxylic acid were dissolved in 50 parts of water containing 10 parts of sodium carbonate solution. The tetrazo solution was added to the piperidine-beta-carboxylic acid solution, followed by sufficient sodium carbonate to render the mass alkaline to brilliant yellow papers. A diazoimino compound of the probable constitution:

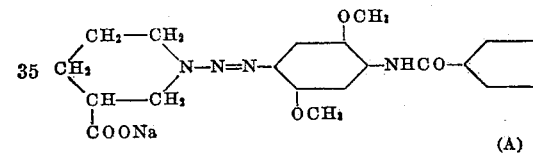 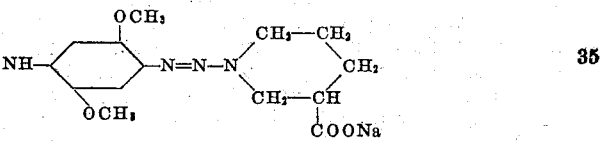

(A)

was thus produced. The product was isolated by evaporating the solution to dryness under reduced pressure. It may be purified to remove inorganic salts by extraction with alcohol, filtration, and the removal of the alcohol by evaporation to dryness.

A printing paste was prepared according to the following formula:

| | Parts |
|---|---|
| Diazoimino compound of Formula A | 7.9 |
| Anilide of 2-3-hydroxy-naphthoic acid | 5.3 |
| Turkey red oil | 3.0 |
| Caustic soda solution of 30% strength | 5.0 |
| Starch-tragacanth thickener | 67.0 |
| Water heated to 160° F | 11.8 |
| | 100.0 |

Cotton piece goods were printed from an engraved copper roll with the above paste. The printed fabric was then subjected to the action of saturated steam containing the vapors of acetic acid, at a temperature of about 212° F. Rapid development of the pattern to a bright blue dyeing results, due to the formation on the fiber of the dyestuff of the formula given in Example 5. The fabric was rinsed, soaped, rinsed and dried. The printed pattern showed good fastness to light and washing.

It is to be understood that the above examples are illustrative only of the means of carrying out this invention and are not intended as a limitaion thereon since numerous other compounds may be substituted for those mentioned in the above examples without departing from the scope of the present invention. For example, among the para-nitro-arylamines which may be used in producing the new aromatic diamines may be mentioned the following:

Para-nitraniline
2-chloro-4-nitraniline
5-nitro-2-amino-anisole
4-chloro-5-nitro-2-amino-anisole
5-nitro-2-amino-1,4-dimethoxy-benzene
2,6-dichloro-4-nitraniline
5-nitro-2-amino-toluene
4-chloro-5-nitro-2-amino-toluene
5-nitro-2-amino-1,4-dimethyl-benzene
5-nitro-2-amino-4-methyl-anisole
2-chloro-4-nitro-1-naphthylamine
2-methoxy-4-nitro-1-naphthylamine The arylene-dicarbonyl-chlorides which are condensed with the para nitro arylamines are preferably selected from dicarboxylic acids of the benzene, naphthalene, diphenyl or diphenyl-ether series. Representative compounds chosen from this series are:

Ortho-, meta- and para-benzene-dicarbonyl-chlorides
2-methyl-benzene-1,4-dicarbonyl-chloride
2-chloro-benzene-1,4-dicarbonyl-chloride
2-methoxy-benzene-1,4-dicarbonyl-chloride
Naphthalene-1,4-dicarbonyl-chloride
Naphthalene-1,8-dicarbonyl-chloride
Diphenyl-4,4'-dicarbonyl-chloride
Diphenyl-2,2'-dicarbonyl-chloride
Diphenyl-ether-4,4'-dicarbonyl-chloride In addition to the aromatic diamines which may be produced by condensing and reducing the para nitro arylamines with the arylene-dicarbonyl-chlorides previously mentioned for purposes of illustration, there may also be mentioned the following diamines which give very satisfactory results when tetrazotized and coupled in accordance with the present invention:

N,N' - di -(2,5 - dimethyl - 4 - aminophenyl) - terephthalamide
N,N' - di -(5 - methyl - 2 - methoxy - 4 - aminophenyl)-terephthalamide
N,N' - di -(2,5 - diethoxy - 4 - aminophenyl) - terephthalamide
N,N' - di -(2,5 - diethoxy - 4 - aminophenyl) - metaphthalamide
N,N' - di -(4 - aminophenyl) - diphenyl - 4,4' - dicarbonylamide
N,N' - di -(2 - methyl - 4 - aminophenyl) - diphenyl-ether-4,4'-dicarbonylamide
N,N' - di -(2,5 - dimethyl - 4 - aminophenyl) - naphthalene-1,4-dicarbonylamide These tetrazotized aromatic diamines are coupled with ice color coupling components, preferably arylamides of 2-3-hydroxy-naphthoic acid, the arylamides of the benzene, naphthalene, diphenyl or diphenyl-ether series which may be further substituted with alkyl, alkoxy, halogen, nitro and carboxanilido (—CONH—C6H5) groups, but which are free from water-solubilizing groups such as sulfonic or carboxylic acid groups having been found to be of particular interest. Among these preferred arylamines may be mentioned the following arylamides of 2-3-hydroxy-naphthoic acid:

Ortho-phenetidide
2'-methoxy-5'-bromo-anilide
2'-ethoxy-5'-chloro-anilide
Para-anisidide
Para-toluidide
2,5-dimethoxyanilide
Dianisidide
Alpha-naphthalide
Meta-nitranilide
4'-carboxanilido-anilide
5-methoxy-2-toluidide Other coupling components may be used in carrying out the process of the present invention such as:

Arylamides of hydroxy-carbazole-carboxylic acids, hydroxy-naphtho-carbazole-carboxylic acids, hydroxy-anthracene-carboxylic acids, hydroxy-diphenylamine-carboxylic acids;
Acyl-acetyl derivatives of aromatic amines, particularly di-aceto-acetyl-o-tolidine;
Alpha and beta naphthol;
N-acyl-amino-naphthols;
Aryl-methyl-pyrazolones.

The herein described invention is of great utility in the preparation of new pigments or of new dyes for use in the ice color art. A recent innovation in the field of ice color production has been the preparation of water-soluble diazoimino compounds by the action of secondary amines containing water-solubilizing groups on the diazotized aromatic amines utilized as the diazo components in the preparation of such colors. Textile fibers are impregnated with mixtures of these diazoimino compounds with the arylamides of 2-3-hydroxy-naphthoic acid or other ice color coupling components, and are then subjected to the action of heat and acid, resulting in reversion of the diazoimino compounds to the parent diazo salts and coupling of these salts with the arylamides to yield the usual insoluble azo dyestuffs. It may here be stated that the present invention is well adapted to such a process, as illustrated by Example 10. In addition to the secondary amine used in this example mention may be made of a few more representative amines selected from this class. These amines are:

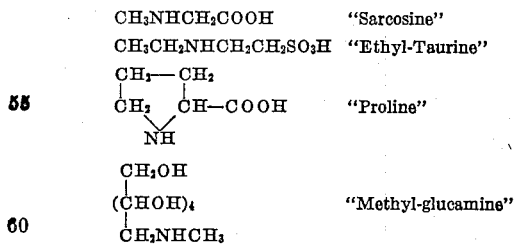

The present invention produces new pigments having very satisfactory fastness properties, and is quite efficacious in the dyeing or printing of textile fibers in attractive shades of excellent brightness and fastness. A wide variety of shades may be readily and economically produced according to the herein described invention which is of considerable commercial importance.

As many apparently widely different embodiments of this invention may be made without departing from the spirit and scope thereof, it is to be understood that I do not limit myself to the specific embodiments thereof except as defined in the appended claims.

I claim:
1. A process for producing water-insoluble azo dyes which comprises coupling an ice color coupling component with the tetrazo salt of a diamine having the following general formula:

NH$_2$—A—NHCO—X—CONH—A—NH$_2$ wherein A represents a para-arylene nucleus free from water-solubilizing groups, and X represents an arylene nucleus free from water-solubilizing groups.

2. A process for producing water insoluble azo dyes which comprises coupling an ice color coupling component with the tetrazo salt of a water insoluble diamine of the following general formula:

NH$_2$—A—NHCO—X—CONH—A—NH$_2$ wherein A represents a para arylene nucleus which may be further substituted by alkyl, alkoxy or halogen groups, and X represents an arylene nucleus which may be further substituted by alkyl, alkoxy or halogen groups.

3. A process for producing water insoluble azo dyes which comprises coupling an arylamide of 2-3-hydroxy-naphthoic acid with the tetrazo salt of a water insoluble diamine of the following general formula:

NH$_2$—A—NHCO—X—CONH—A—NH$_2$ wherein A represents a para arylene nucleus of the benzene or naphthalene series, and X represents an arylene nucleus of the benzene or naphthalene series.

4. A process for producing water insoluble azo dyes which comprises coupling an anilide of 2-3-hydroxy-naphthoic acid with the tetrazo salt of a diamine of the following general formula:

NH$_2$—A—NHCO—X—CONH—A—NH$_2$ wherein A represents a para phenylene nucleus which may be further substituted by alkyl, alkoxy or halogen groups, and X represents a phenylene nucleus which may be further substituted by alkyl, alkoxy or halogen groups.

5. A process for producing a water-insoluble azo dye which comprises coupling tetrazotized N,N'-di-(2-methyl-4-aminophenyl)-terephthalamide with the ortho-anisidide of 2-3-hydroxy-naphthoic acid.

6. A process for producing a water-insoluble azo dye which comprises coupling tetrazotized N,N'-di-(2-methoxy-4-aminophenyl)-terephthalamide with the ortho-anisidide of 2-3-hydroxy-naphthoic acid.

7. A process for producing a water-insoluble azo dye which comprises coupling tetrazotized N,N'-di-(2-5-dimethoxy-4-amino-phenyl)-terephthalamide with the anilide of 2-3-hydroxy-naphthoic acid.

8. Water-insoluble azo dyes having the following general formula:

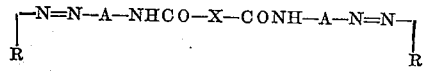

wherein R represents the radical of an ice color coupling component, A represents a para-arylene nucleus free from water-solubilizing groups, and X represents an arylene nucleus free from water-solubilizing groups.

9. Water-insoluble azo dyes having the following general formula:

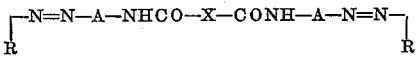

wherein R represents the radical of an ice color coupling component, A represents a para arylene nucleus which may be further substituted by alkyl, alkoxy or halogen groups, and X represents an arylene nucleus which may be further substituted by alkyl, alkoxy or halogen groups.

10. Water-insoluble azo dyes having the following general formula:

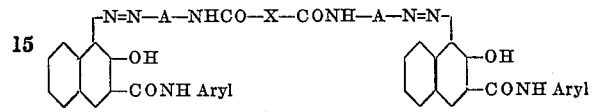

wherein Aryl represents an aryl radical, A represents a para arylene nucleus of the benzene or naphthalene series, and X represents an arylene nucleus of the benzene or naphthalene series.

11. Water-insoluble azo dyes having the following general formula:

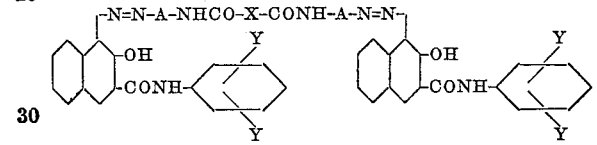

where Y represents a hydrogen, alkyl, alkoxy or halogen group, A represents a para arylene nucleus of the benzene series which may be further substituted by alkyl, alkoxy or halogen groups, and X represents an arylene nucleus of the benzene series which may be further substituted by alkyl, alkoxy or halogen groups.

12. A water-insoluble azo dye having the following formula:

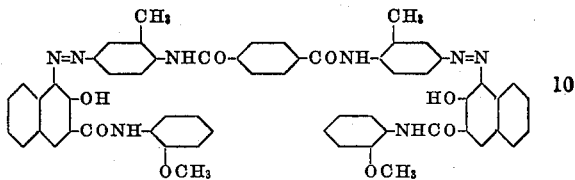

13. A water-insoluble azo dye having the following formula:

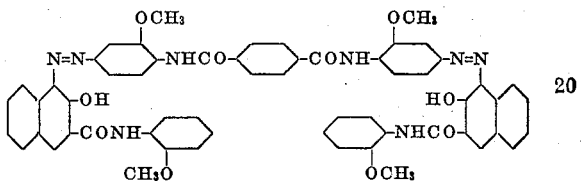

14. A water-insoluble azo dye having the following formula:

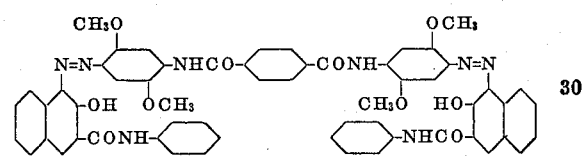

MILES AUGUSTINUS DAHLEN.